United States Patent [19]

Crowe

[11] 3,917,535
[45] Nov. 4, 1975

[54] AQUEOUS BASED EMULSION FOR TREATING SUBTERRANEAN FORMATIONS

[75] Inventor: Curtis W. Crowe, Tulsa, Okla.

[73] Assignee: The Dow Chemical Company, Midland, Mich.

[22] Filed: Jan. 12, 1973

[21] Appl. No.: 323,969

[52] U.S. Cl............ 252/8.55 C; 166/307; 166/308; 252/8.55 R
[51] Int. Cl.² .......................................... E21B 43/28
[58] Field of Search ............... 252/8.55 R, 8.55 C; 166/307, 308

[56] References Cited
UNITED STATES PATENTS

| | | | |
|---|---|---|---|
| 2,802,531 | 8/1957 | Cardwell et al. | 166/42 |
| 3,044,549 | 7/1962 | Jones | 166/307 |
| 3,319,714 | 5/1967 | Knox | 166/42 |
| 3,323,593 | 6/1967 | Foshee et al. | 166/282 |
| 3,572,416 | 3/1971 | Kinney et al. | 166/307 |
| 3,591,511 | 7/1971 | Leeds | 252/8.55 C |
| 3,625,284 | 12/1971 | Gogarty et al. | 166/307 |
| 3,754,599 | 8/1973 | Hummel et al. | 166/307 |
| 3,779,915 | 12/1973 | Kucera | 252/8.55 C |
| 3,779,916 | 12/1973 | Crowe | 166/307 |
| 3,799,266 | 3/1974 | Kiel | 166/308 |

Primary Examiner—Benjamin R. Padgett
Assistant Examiner—B. H. Hunt
Attorney, Agent, or Firm—Bruce M. Kanuch

[57] ABSTRACT

An improved composition and method for acidizing hydrocarbon producing subterranean formations is provided. An acidizing composition comprising an aqueous acid solution which reacts with at least a portion of the formation and having dispersed therein an acid insoluble essentially aromatic free organic liquid having a viscosity of at least about 5 centipoise and a water-wetting surfactant is introduced into the formation. This particular composition increases the acid penetration distance within the formation.

7 Claims, No Drawings

AQUEOUS BASED EMULSION FOR TREATING SUBTERRANEAN FORMATIONS

BACKGROUND OF THE INVENTION

In the art of acidizing hydrocarbon containing subterranean formations, it is desirable to increase the area of formation face over which a given volume of acid will react to increase the permeability of the formation. In many instances it is desired to both fracture and acidize the formation. The distance along a fracture, measured from the borehole, that can be contacted with a given concentration of acid is known as the acid penetration distance. For obvious reasons, it is desirable to increase the acid penetration distance of acidizing solutions. It is known that two characteristics of the acidizing solution will affect the acid penentration distance: (a) reaction rate of the acid solution and (b) the fluid loss properties of the acid solution.

It has also been suggested that at elevated temperatures, fluid loss is the most critical of the two factors to control.

The reaction rate of an acid solution is defined as the rate in lbs/ft$^2$/sec which limestone is dissolved by an acid solution. The reaction rate is influenced by such factors as temperature, pressure, acid flow velocity, rock surface area to acid volume ratio and acid concentration.

The fluid loss rate of an aqueous solution is the rate at which an aqueous solution is lost to the more permeable portions of a formation and therefore not available for treatment of less permeable areas. It is appreciated that the acid penetration distance can be increased if the reaction rate and fluid loss properties of the acid solution are reduced.

Several techniques have been proposed to reduce one or the other or both of these properties. For example, in U.S. Pat. No. 3,044,549 the reaction rate of an acid solution is reduced by dispersing the acid solution into a continuous oil phase, i.e., the acid solution is present as a fine dispersion of droplets in a continuous oil phase.

Several fluid loss additives have been proposed to reduce the fluid loss of acid solutions. Such additives include, for example, gel-formers such as soaps, natural gums, finely divided solids and the like. There are disadvantages associated with most of these additives. Several of the gums degrade at elevated temperatures and thus become ineffective. Other gums or polymers and solids may be more stable at elevated temperatures but, because of the increased stability, they are difficult to remove from the formation and, therefore, can damage the formation and reduce production therefrom.

Although it has been suggested that the fluid loss properties of aqueous drilling muds can be improved by emulsifying an oil into the mud, there has been no suggestion that acidizing treatments can be improved by employing an oil in acid emulsion composition containing a water-wetting surfactant.

SUMMARY OF THE INVENTION

A non-solids containing fluid loss additive, comprising a high viscosity essentially aromatic free organic liquid, and a water-wetting surfactant are dispersed into an aqueous acid solution to form an emulsion. The aqueous acid solution comprises the continuous phase. The emulsion can be employed to fracture and/or acidize subterranean formations whereby loss of the aqueous acid liquid to the more permeable zones of the formation is substantially reduced.

DETAILED DESCRIPTION OF THE INVENTION

Any viscous organic liquid having a viscosity within the range of about 5-10,000 centipoise (cps), preferably 25-2,000 cps at a temperature of about 75°F can be employed. The organic liquid should preferably contain less than about 20 per cent by weight of aromatics and should be substantially insoluble in the aqueous acid solution. The viscous organic liquid can be, for example, a petroleum oil such as, for example, diesel, fuel or motor oil. It is preferred to employ an organic liquid which inherently has the indicated viscosity. However, the viscosity of the organic liquid can be increased by employing viscosity improving agents which are not harmful to the formation being treated.

The viscous oil is disperssed in an aqueous acid solution so that the oil comprises the dispersed phase. A volume ratio of oil to aqueous acid solution ranging from about 5 to about 50 percent, preferably from about 20 to about 50 can be employed.

A surfactant (surface active agent) is required in the composition. The type of surfactant is critical in that it must be water-wetting, i.e., a surface treated with it tends to be water-wet not oil-wet. The surfactant aids in emulsifying the oil into the aqueous phase. Types of surfactants which are useful include, for example, alkyl phenol ethylene oxide adducts, quaternary amines and ethylene oxide adducts of linear alcohols. Specific surfactants include, for example, an alkyl phenoxy poly-(ethyleneoxy) ethanol, steryl trimethyl n($C_{10}$-$C_{12}$) alcohol + 5 moles ammonium chloride of ethylene oxide. The surfactant should be employed in an amount which is sufficient to form an emulsion which has less than about 10 per cent of oil breakout at a temperature of 75°F in 1 hour. It is well-known that the amount of surfactant to be employed is dependent on such factors as type of surfactant, oil to acid volume ratio and the like.

The aqueous acid solution comprises any acidic solution which can solubilize a portion of the subterranean formation to be treated. Most often the aqueous acid solution contains from about 3 to about 35 per cent by weight of a mineral or organic acid such as HCl, HF, acetic, formic, sulfamic, etc. An acid is employed which is reactive with and will dissolve at least a portion of the formation to be treated. The aqueous acid solution should not be appreciably thickened to increase the viscosity thereof.

An acidic solution having dispersed therein a viscous oil, as defined hereinbefore, can be used to acidize and/or fracture subterranean formations. By employing the low fluid loss emulsion, the penetration distance of the aqueous acid solution is increased. Formations are acidized and/or fractured employing the composition of the present invention utilizing techniques and equipment well-known in the art.

EXAMPLE 1

Fluid loss tests were conducted on 1 × 6 inches Bedford limestone cores held in a Hassler sleeve. Test fluids were forced through the cores at an injection pressure of 1000 psi. A brine solution composed of 2.5 per cent by weight of $CaCl_2$ and 8.0 per cent of NaCl was first employed to establish the flow rate of an inert fluid through the core. The average flow rate through the cores was determined to be 0.7 ml. per minute at room temperature.

The results of treating the cores with various acid solutions was determined and the results set forth in the following Table I.

Table I

| Treatment Fluid | Temperature | Total Flow Through Core in 25 Minutes |
|---|---|---|
| 15% Aqueous HCl solution | 75°F | Acid channeled through core in 1 minute and 15 seconds creating a 1/16 inch diameter hole |
| An emulsion containing 30% by volume of dispersed 10 weight motor oil, 70% by volume of a 15% HCl solution and a water wetting surfactant* | 75°F | 2.7 ml. |
| '' | 150°F | 4.8 ml. |
| '' | 200°F | 7.6 ml. |
| '' | 300°F | 19.0 ml. |

*An anionic surfactant of alkylphenoxypoly (ethyleneoxy) ethanol.

In no test did the acid-oil emulsion channel through the core.

What is claimed is:

1. A method of fracturing a subterranean geologic formation which comprises:
 injecting a sufficient quantity of an aqueous acid based emulsion into the formation to fracture said formation, said aqueous acid based emulsion comprising as the external phase an aqueous acid solution in which at least a portion of the formation is soluble, as the internal phase from about 20 to about 50 per cent by volume of an organic liquid having a viscosity of from about 5 to about 10,000 centipoise at a temperature of about 75°F and containing less than about 20 per cent by weight of aromatics, and a water-wetting surfactant.

2. The method of claim 1 wherein said aqueous acid phase comprises an acidic solution which is reactive with said formation to be fractured.

3. The method of claim 1 wherein said organic liquid has a viscosity ranging from about 25 to about 2,000 centipoise.

4. A method of increasing the permeability of a subterranean geologic formation which comprises:
 contacting said formation with an emulsion comprising an organic liquid, a water-wetting surfactant, and an aqueous acid solution which is reactive with said formation to dissolve away a portion of said formation, said aqueous acid solution comprising the external phase, and said organic liquid has a viscosity ranging from about 5 to about 10,000 centipoise, contains less than about 20 per cent by weight of aromatics and comprises from about 20 to about 50 per cent by volume of the emulsion.

5. The method of claim 4 wherein said organic liquid has a viscosity ranging from about 25 to about 2,000 centipoise.

6. The method of claim 1 wherein the aqueous acid phase of the emulsion is substantially free from agents for increasing the viscosity of said phase.

7. The method of claim 4 wherein the aqueous acid solution is substantially free from agents for increasing the viscosity of said phase.

* * * * *